(12) United States Patent
Dickerman

(10) Patent No.: US 10,507,749 B1
(45) Date of Patent: Dec. 17, 2019

(54) ELECTROSTATIC DISCHARGE MITIGATOR FOR VEHICLES

(71) Applicant: Robert Leon Dickerman, Northfield, MA (US)

(72) Inventor: Robert Leon Dickerman, Northfield, MA (US)

( * ) Notice: Subject to any disclaimer, the term of this patent is extended or adjusted under 35 U.S.C. 154(b) by 164 days.

(21) Appl. No.: 15/645,483

(22) Filed: Jul. 10, 2017

Related U.S. Application Data

(62) Division of application No. 14/961,534, filed on Dec. 7, 2015, now Pat. No. 9,751,444.

(51) Int. Cl.
| | |
|---|---|
| *H05F 3/02* | (2006.01) |
| *B60N 2/58* | (2006.01) |
| *B60N 2/70* | (2006.01) |
| *B60R 16/06* | (2006.01) |
| *B60N 2/60* | (2006.01) |

(52) U.S. Cl.
CPC ............... *B60N 2/70* (2013.01); *B60N 2/58* (2013.01); *B60N 2/60* (2013.01); *B60R 16/06* (2013.01); *H05F 3/02* (2013.01)

(58) Field of Classification Search
CPC .... B60N 2/70; B60N 2/58; B60N 2/60; H05F 3/02; B60R 16/06
See application file for complete search history.

(56) References Cited

U.S. PATENT DOCUMENTS

| | | |
|---|---|---|
| 1,744,004 A | 1/1930 | Hunt |
| 2,524,163 A | 10/1950 | Criss |
| 2,614,155 A | 10/1952 | Lippy |
| 2,627,901 A | 2/1953 | Simon et al. |
| 2,714,181 A | 7/1955 | Azbill |
| 2,751,523 A | 6/1956 | Adams |
| 2,802,148 A | 8/1957 | Allder |

(Continued)

FOREIGN PATENT DOCUMENTS

| | | |
|---|---|---|
| CA | 2601262 A1 | 10/2006 |
| DE | 19745869 A1 | 5/1998 |

(Continued)

OTHER PUBLICATIONS

Chubb, John, The Control of Body Voltage Getting Out of a Car, [online], Mar. 1998, [retrieved on Jan. 28, 2014], John Chubb Instrumentation, Unit 30, Landown Industrial Estate, Gloucester Road, Cheltenham, GL51 8PL, UK. Retrieved from the Internet <URL: http://www.chilworth.co.uk/media/124110/JCI%20-%20John%20Chubb%20Instrumentation2.htm>.

(Continued)

*Primary Examiner* — Michael C Zarroli

(57) ABSTRACT

A system for mitigating electrostatic discharge (ESD) that may occur during egress from vehicles is provided. One embodiment comprises a narrow conductive electrode that is galvanically connected to the vehicle chassis, and that is applied to that one edge of a seat which is next to the door nearest that seat. For example, in the U.S., this edge will normally be the left edge of the driver's seat, or the right edge of the front passenger's seat. The electrode is substantially located on a normally unoccupied surface of the seat cushion. Other embodiments further include pointed shapes on the electrode to increase the electric field intensity, which may promote more complete discharging.

7 Claims, 5 Drawing Sheets

(56) References Cited

U.S. PATENT DOCUMENTS

| | | | |
|---|---|---|---|
| 2,858,482 A | 10/1958 | Nutter | |
| 3,099,774 A | 7/1963 | Crane | |
| 3,378,726 A | 6/1968 | Lankow | |
| 4,513,347 A * | 4/1985 | Wilcox | H05F 3/02 361/212 |
| 4,633,364 A | 12/1986 | Nakamura et al. | |
| 4,676,376 A * | 6/1987 | Keiswetter | B60N 2/60 206/449 |
| 5,179,497 A | 1/1993 | Bakhoum | |
| 5,213,865 A | 5/1993 | Yamada | |
| 5,331,502 A | 7/1994 | Bakhoum | |
| 5,518,055 A | 5/1996 | Teeple et al. | |
| 5,525,411 A * | 6/1996 | Stewart | A47C 31/004 442/56 |
| 5,719,739 A | 2/1998 | Horiguchi | |
| 5,761,022 A | 6/1998 | Rankilor | |
| 5,825,605 A | 10/1998 | Sutherland | |
| 6,302,487 B1 * | 10/2001 | Fujita | B60N 2/5825 297/452.56 |
| 6,459,560 B1 | 10/2002 | Beribisky | |
| 7,002,786 B2 | 2/2006 | Signorino | |
| 7,013,930 B2 | 3/2006 | Mann | |
| 7,733,623 B2 | 6/2010 | Lee | |
| 8,422,191 B2 | 4/2013 | McEnhill et al. | |
| 9,751,444 B2 * | 9/2017 | Dickerman | B60N 2/70 |
| 2008/0246296 A1 | 10/2008 | McQueen et al. | |
| 2009/0001787 A1 | 1/2009 | Lawall et al. | |
| 2011/0267735 A1 * | 11/2011 | Kow | H05F 3/02 361/220 |

FOREIGN PATENT DOCUMENTS

| | | | | |
|---|---|---|---|---|
| JP | 05168547 A | * | 7/1993 | A47C 17/00 |
| JP | H05168547 | * | 7/1993 | |

OTHER PUBLICATIONS

Beaty, William J., Car Door Sparks, [online],1997, [retrieved on May 11, 2016]. Retrieved from the Internet <URL: http://amasci.com/emotor/zapped.html>.

United Static Control Products, ElectraSolve, Datasheet [online], 2014, [retrieved on May 11, 2016]. Retrieved from the Internet <URL: http://store.unitedesd.com/ProductDetails.asp?ProductCode=E-Solve-Mini>.

Nelson, Elizabeth, Tex-Stat, Co. Creates New "Antishock Brush", [online], 2011, [retrieved on Jan. 8, 2014]. Retrieved from the Internet <URL: http://www.esdjournal.com/archives/articles/2002_and_before/statbrsh/statbrush.htm>.

Renkes, Robert N., Fires at Refueling Sites That Appear to Be Static Related—Summary [online], Mar. 2010, [retrieved on Jan. 7, 2014], Petroleum Equipment Institute, Tulsa, Oklahoma. Retrieved from the Internet <URL: http://www.pei.org/Portals/0/resources/documents/Refueling%20Fire%20Incidents.pdf>.

Von Pidoll, Dr. Urich, DGMK Project 508—Avoidance of ignition of gasoline/air mixture during refueling of motor vehicles at filling stations, 1996, DGMK German Society for Petroleum and Coal Science and Technology, Uberseering 40, 33397 Hamburg, Germany.

Hearn, Graham, The role of static electricity in forecourt fires in Europe, Wolfson Electrostatics, 32 Church Lane, Highfield, Southampton, SO17 1SZ, United Kingdom, 2016.

American Petroleum Institute, Staying Safe at the Pump, [online], 2014, [retrieved on May 11, 2016], 1220 L Street, NW, Washington, DC 20005-4070. Retrieved from the Internet <URL: http://www.api.org>.

Hearn, Graham, Can static electricity cause unintentional airbag deployment in vehicles?, [online], 2014, [retrieved on May 11, 2016], Wolfson Electrostatics, 32 Church Lane, Highfield, Southampton, SO17 1SZ, United Kingdom. Retrieved from the Internet <URL: http://www.wolfsonelectrostatics.com/04_news/index.html#can-static-electricity-cause-unintentional-airbag-deployment-in-vehicles>.

Pratt, Thomas H., Electrostatic Ignitions of Fires and Explosions, pp. 101-108, 1997, John Wiley and Sons, 10475 Crosspoint Blvd., Indianapolis, IN 46256.

Conductive Fiber Manufacturers Council, [online], 2016, [retrieved on May 11, 2016]. Retrieved from the Internet <URL: http://www.cfibermfg.com/ >.

Electrostatics.net, [online], 2016, [retrieved on May 11, 2016]. Retrieved from the Internet <URL: http://www.electrostatics.net/articles/static_shocks.htm>.

AlphaLab, Inc., The Triboelectric Series, [online], 2014, [retrieved on May 11, 2016]. Retrieved from the Internet <URL: http://www.trifield.com/content/tribo-electric-series/>.

AlphaLab, Inc., Common Static Electricity Problems and Remedies, [online], 2014, [retrieved on May 11, 2016]. Retrieved from the Internet <URL: http://www.trifield.com/content/fixing-common-static-problems/>.

Duquesne, Sophie, et al., Multifunctional Barriers for Flexible Structure: Textile, Leather, and Paper, pp. 63-83, 2007, Springer-Verlag Berlin Heidelburg, New York, NY.

Mizter.com, Datasheet [online], 2016, [retrieved on May 11, 2016]. Retrieved from the Internet <URL: http://www.mizter.com /car-antistatic-ground-strap-assembly.htm>.

Amazon.com, Datasheet [online], 2014, [retrieved on Mar. 7, 2014]. Retrieved from the Internet <URL: http://www.amazon.com /Gates-90330-Static-Rubber-Length/dp/B009SEJDXE >.

Flora, Snowden D., Report of the Kansas State Board of Agriculture, The Climate of Kansas, Dust Storms, [online], 1948, [retrieved on Feb. 19, 2014], Topeka, Kansas. Retrieved from the Internet <URL: http://www.ksre.ksu.edu/wdl/climate/cok/indexcopy.asp?page=271>.

* cited by examiner

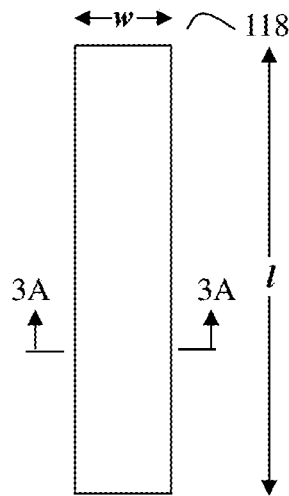
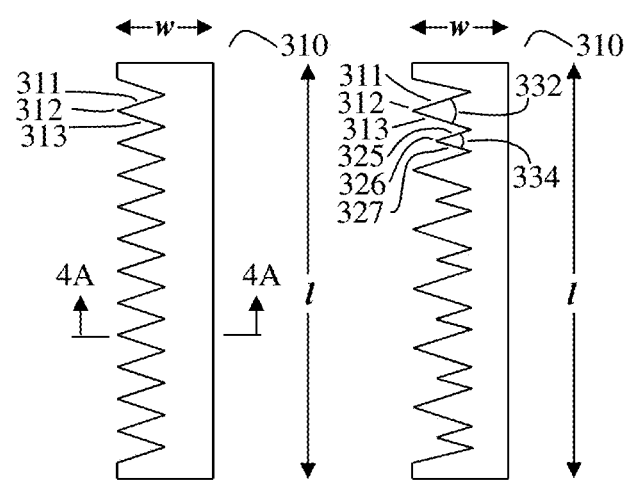
FIG. 3  FIG. 4  FIG. 4B
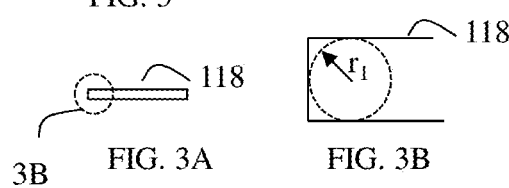
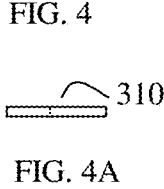
3B  FIG. 3A  FIG. 3B  FIG. 4A
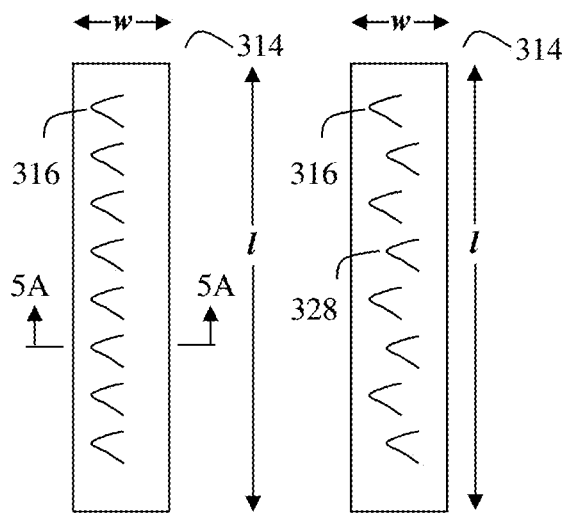
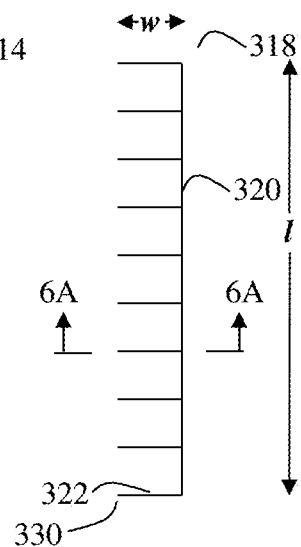
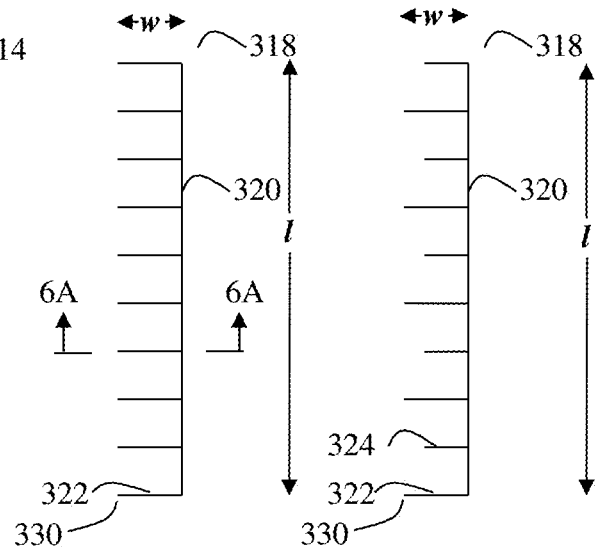
FIG. 5  FIG. 5B  FIG. 6  FIG. 6B
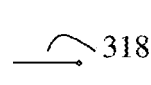
FIG. 5A  FIG. 6A

ELECTROSTATIC DISCHARGE MITIGATOR FOR VEHICLES

CROSS REFERENCE TO RELATED APPLICATIONS

This application is a divisional of co-pending U.S. patent application Ser. No. 14/961,534 filed Dec. 7, 2015, the entire disclosure of which is hereby incorporated by reference.

FIELD OF THE INVENTION

The present invention relates to a method and apparatus for mitigating the incidence and effect of electrostatic discharge for an individual who is exiting a vehicle.

BACKGROUND OF THE INVENTION

Many people experience painful and disturbing electrical shocks due to electrostatic discharge (ESD) when they exit their vehicles during dry weather. Observations, field tests and measurements have shown that the ESDs that cause such shocks are predominantly caused by triboelectric charging of the human body due to the separation of dissimilar materials as occupants exit a vehicle. Often, ESDs occur when a person's charge is neutralized by a connection to earth ground as he or she touches a conductive part of a vehicle after exiting.

In addition to the considerable discomfort caused by such ESD, reports by the Petroleum Equipment Institute in 2010 (below), suggest that such body charging was likely responsible for sparks that started almost two hundred fires, some deadly, at gasoline filling stations in the U.S., from 1999 to 2004. Static-related fires continue to occur, although the number of fires per year has dropped since that time due, in part, to improved filling station practices such as eliminating pump nozzle latches and the posting of safety instructions at pumps. Numerous other petroleum industry studies, including one by the American Petroleum Institute in 2014 (below), provide evidence of human body charging as the cause of fires.

Hearn, in 2014 (below), disclosed that human body triboelectric charging has also been implicated in the unintentional deployment of some air bags.

Since the subject ESDs likely occur many hundreds of millions of times per year or more in the U.S. alone, it seems prudent to shift the odds in favor of consumer comfort and safety.

PRIOR ART

Prior art for the mitigation of ESD between people and vehicles has been less than satisfactory. The following is a list of some prior art that presently appears relevant:

| Pat. or Pub. Nr. | Kind Code | Issue or Pub. Date | Patentee or Applicant | Topic |
| --- | --- | --- | --- | --- |
| U.S. Pat. No. 1,744,004 | | Jan. 14, 1930 | Hunt | conductive seats |
| U.S. Pat. No. 2,524,163 | | Oct. 3, 1950 | Criss | vehicle grounding |
| U.S. Pat. No. 2,614,155 | | Oct. 14, 1952 | Lippy | conductive steering wheel |
| U.S. Pat. No. 2,627,901 | | Feb. 10, 1953 | Simon et al. | esters as seat fabric treatments |
| U.S. Pat. No. 2,714,181 | | Jul. 26, 1955 | Azbill | strap-on conductive seat bands |
| U.S. Pat. No. 2,751,523 | | Jun. 19, 1956 | Adams | strap-on conductive seat bands |
| U.S. Pat. No. 2,802,148 | | Aug. 6, 1957 | Allder | conductive seats |
| U.S. Pat. No. 2,858,482 | | Oct. 28, 1958 | Nutter | conductive seats |
| U.S. Pat. No. 3,099,774 | | Jul. 30, 1960 | Crane | touch pad, pendants |
| U.S. Pat. No. 3,378,726 | | Jun. 6, 1966 | Lankow | conductive seat cover |
| U.S. Pat. No. 4,633,364 | | Dec. 30, 1986 | Nakamura et al. | touch pad, resistive |
| U.S. Pat. No. 5,179,497 | | Jan. 12, 1993 | Bakhoum | ground-free discharger, lapsed |
| U.S. Pat. No. 5,213,865 | | May 25, 1993 | Yamada | anti-static floor mat for vehicle |
| U.S. Pat. No. 5,331,502 | | Jul. 19, 1994 | Bakhoum | discharge cover |
| U.S. Pat. No. 5,518,055 | | May 21, 1996 | Teeple et al. | conductive tire |
| U.S. Pat. No. 5,719,739 | | Feb. 17, 1998 | Horiguchi | exothermic ionizer |
| DE 19745869 | A1 | May 7, 1998 | Schumann et al. | Volkswagen, cond. door handle |
| U.S. Pat. No. 5,761,022 | | Jun. 2, 1998 | Rankilor | touch pad, resistive |
| U.S. Pat. No. 5,825,605 | | Oct. 20, 1998 | Sutherland | cond. door handle, lapsed |
| U.S. Pat. No. 6,459,560 | B1 | Oct. 1, 2002 | Beribisky | key pendant |
| U.S. Pat. No. 7,002,786 | B2 | Feb. 21, 2006 | Signorino | cond. door handle, with 3 V bat. |
| U.S. Pat. No. 7,013,930 | B2 | Mar. 21, 2006 | Mann | filling station touch pad, resistive |
| CA 2601262 | A1 | Nov. 2, 2006 | Demott, et al. | anti-static fabric treatment |
| U.S. 2008/0246296 | A1 | Oct. 9, 2008 | McQueen et al. | GM, conductive seats, abandoned |
| U.S. 2009/0001787 | A1 | Jan. 1, 2009 | Lawall et al. | GM, ionized air seats, abandoned |
| U.S. Pat. No. 7,733,623 | B2 | Jun. 8, 2010 | Moon Koo Lee | steering wheel cover |
| U.S. Pat. No. 8,422,191 | B2 | Apr. 16, 2013 | McEnhill et al. | Honda, conductive seats |

Non-Patent Literature

CHUBB, JOHN, The Control of Body Voltage Getting Out of a Car, March, 1998, John Chubb Instrumentation, Unit 30, Landown Industrial Estate, Gloucester Road, Cheltenham, GL51 8PL, UK, http://www.chilworth.co.uk/media/124110/JCI%20-%20John%20Chubb%20Instrumentation2.htm.

BEATY, WILLIAM J., Car Door Sparks, 1997, http://amasci.com/emotor/zapped.html.

United Static Control Products, ElectraSolve, 2014, http://store.unitedesd.com/ProductDetails.asp?ProductCode=E-Solve-Mini NELSON, ELIZABETH, TEX-STAT, CO. Creates New "Antishock Brush", 2011, http://www.esdjournal.com/archives/articles/2002_and_before/statbrsh/statbrush.htm.

RENKES, ROBERT N., Fires at Refueling Sites That Appear To Be Static Related—Summary, March 2010, Petroleum Equipment Institute, Tulsa, Okla., http://www.pei.org/Portals/0/resources/documents/Refueling%20Fire%20Incidents.pdf.

VON PIDOLL, DR. URICH, DGMK Project 508—Avoidance of ignition of gasoline/air mixture during refueling of motor vehicles at filling stations, 1996, DGMK German Society for Petroleum and Coal Science and Technology, Uberseering 40, 33397 Hamburg, Germany.

HEARN, GRAHAM, The role of static electricity in forecourt fires in Europe, Wolfson Electrostatics, 32 Church Lane, Highfield, Southampton, SO17 1SZ, United Kingdom.

American Petroleum Institute, Staying Safe at the Pump, 2014, 1220 L Street, NW, Washington, D.C. 20005-4070, http://www.api.org.

HEARN, GRAHAM, Can static electricity cause unintentional airbag deployment in vehicles?, 2014, Wolfson Electrostatics, 32 Church Lane, Highfield, Southampton, SO17 1SZ, United Kingdom, http://www.wolfsonelectrostatics.com/04_news/index.html#can-static-electricity-cause-unintentional-airbag-deployment-in-vehicles.

PRATT, THOMAS H., Electrostatic Ignitions of Fires and Explosions, pp. 101-108, 1997, John Wiley and Sons, 10475 Crosspoint Blvd., Indianapolis, Ind. 46256.

Conductive Fiber Manufacturers Council, http://www.cfibermfg.com/

Electrostatics.net, http://www.electrostatics.net/articles/static_shocks.htm

AlphaLab, Inc., The Triboelectric Series, 2014, http://www.trifield.com/content/tribo-electric-series/

AlphaLab, Inc., Common Static Electricity Problems and Remedies, 2014, http://www.trifield.com/content/fixing-common-static-problems/

DUQUESNE, SOPHIE, et al., Multifunctional Barriers for Flexible Structure: Textile, Leather, and Paper, pp. 63-83, 2007, Springer-Verlag Berlin Heidelburg, New York, N.Y.

Mizter.com, http://www.mizter.com/car-antistatic-ground-strap-assembly.htm amazon.com, http://www.amazon.com/Gates-90330-Static-Rubber-Length/dp/B009SEJDXE FLORA, SNOWDEN D., Report of the Kansas State Board of Agriculture, The Climate of Kansas, Dust Storms, 1948, Topeka, Kans., http://www.ksre.ksu.edu/wdl/climate/cok/indexcopy.asp?page=271

Prior art methods for the mitigation of ESD between people and vehicles have been less than satisfactory.

The many prior patents concerned with the elimination of ESD shocks and sparks associated with vehicles are of three types: those concerned with vehicle charging, those concerned with human body charging that use devices that require conscious action to discharge the body, and those concerned with human body charging that use devices that do not require conscious action to discharge the body.

A preponderance of the early patents fall into the first group, and focus on discharging the vehicle itself, as well as on eliminating shocks to persons that occur while the persons are in the vehicle. Objectionable vehicle charging (versus human body charging) was more common in the past, particularly under certain conditions. Flora, in 1948 (above), reported that these conditions, prevalent in the Dust Bowl of the mid-western United States in the 1930s, included very dusty air, together with tires or road surfaces with very low conductivity. Contact of the vehicles with dust particles, and subsequent separation from dust particles, charged the vehicles themselves. Further, some early tires were fabricated of non-conductive rubber, and had no steel belts, and the use of road salt was less prevalent. Therefore, the resistance between a vehicle and the earth was often too high to bleed off charge in a timely manner. Chubb, Hearn, and AlphaLab, Inc. (above) have indicated that, in the absence of the dusty conditions mentioned above, significant vehicle charging does not normally occur due to the passage of clean air over a vehicle. However, minor and transient triboelectric charging may occur due to tire contact with the road if the tire and road resistance are sufficiently high.

In the past, a common solution to vehicle charging was to attach a conductive "grounding chain" to a vehicle's chassis, and to drag the chain on the ground, thereby providing a discharge path from the vehicle to the earth. Drag chains have since been outlawed in some locales, because of the possibility that such devices may create ESD sparks at filling stations, and because of the mechanical hazards associated with dragging such substantial components. However, conductive polymer drag straps continue to be sold and employed for grounding, particularly for some fuel transportation vehicles, at, for example, Mizter.com, and amazon.com (above). Even when employed for this legitimate purpose, drag straps are not convenient, because they quickly wear away to the point where contact with the ground is not maintained, thereby requiring frequent replacement. Many related specialized vehicle grounding devices have been suggested, but these are complex, costly, and some may be unusable at high speeds. U.S. Pat. No. 2,524,163 issued to Criss (above), is an example. Bakhoum and Horiguchi (above) disclosed using an ionizer to generate and disperse air ions that can carry away any vehicle charge, without contacting the ground. The use of an ionizer was also recently disclosed by Lawell et al., in a U.S. Patent Application assigned to General Motors (above). The ionizer approach, even if it could be made to work, increases the complexity and cost of the vehicle, and raises the specter of inadvertent extreme charging of vehicles in the event that proper control of the ionizer is not maintained.

In addition to all of their previously mentioned disadvantages, methods and devices for discharging passenger vehicles are typically moot today, for the following reason. It was recommended as early as 1996 by Von Pidoll (above), a petroleum engineer, that vehicle tires be made conductive to help prevent vehicle charging. This is a reasonable approach, and one that seems to have been largely adopted by present-day tire manufacturers; an example of a patent that has been issued on inventions that implement this approach is U.S. Pat. No. 5,518,055 issued to Teeple et al., and assigned to Michelin (above). Today's tires typically have steel belts, which tend to increase tire conductance, and the tire rubber is formulated to be slightly conductive; further, tire conductivity is serendipitously enhanced in areas where road salt is used.

The results of measurements of vehicle-to-ground resistance are consistent with these views. Vehicle-to-moist-concrete-floor resistance for a test vehicle was measured as about 25.0 MΩ, and vehicle-to-moist-dirt-floor resistance as about 2.0 MΩ. Measurement of a clean single "doughnut" spare tire yielded a dry-wheel-to-ground resistance of about 60.0 MΩ. These resistances are sufficiently low to discharge a vehicle within a second or so. These results are consistent with the fact that all of the several different vehicles used in tests were apparently sufficiently grounded through the tires so that the vehicles' voltages, when measured with an electrostatic field locator, were always <100.0V with respect to earth. It was found that, to charge a vehicle above that level, it was necessary to first deliberately insulate the entire vehicle from contact with the earth by driving the vehicle onto clean, insulating plastic panels.

Further evidence that vehicle discharging devices are impractical or moot in consumer passenger vehicle applications is that consumers who have purchased and deployed such devices often report that "they don't work", as may be seen in reviews of a Gates strap at amazon.com.

The application of a discharging device to a modern passenger vehicle typically constitutes a misguided attempt to discharge a vehicle that has already been discharged to earth through its tires. Therefore, these devices and methods are generally not satisfactory, because they attempt to discharge the wrong object—namely, the vehicle.

Another aspect of the incidence of electrostatic discharge for individuals that has changed over time is that, in the early years of motoring, occupants were frequently shocked while in transit. This was because many of the components in the passenger compartments of early vehicles were made of metal. Occupants' bodies became electrically charged as they moved on the insulated vehicle seats. When they subsequently touched the metal parts inside the passenger compartment that were galvanically bonded to the chassis of the vehicle, they would experience one or more shocks while in transit. In modern times nearly all components in the passenger compartment of passenger vehicles are made of non-conductive plastic; hence, the present-day propensity for accumulating charge while inside the vehicle, and for discharging while exiting.

The second group of patents propose devices whose purpose is to prevent human body charging by electrically connecting the human body to the vehicle chassis during or after egress from the vehicle, but that require conscious action to actuate. These devices include probes, brushes, and vehicle-mounted buttons and touch pads. None of them are satisfactory because they all require conscious manipulation for proper operation. Such conscious manipulation is likely to be intermittent and inconsistent.

Furthermore, some of these devices simply mitigate the pain of discharge by discharging the occupant through an intervening conductor, rather than discharging directly from the skin; devices disclosed by Crane, Beribisky, and Nelson (above) are examples of this. These are portable hand-held wands, thimbles, or brushes that the occupant uses to touch the vehicle body with after exiting the vehicle. They reduce the feeling of shock by providing a larger conductive surface area at the fingertips during discharge, thereby reducing the current density in the body tissue of extremities during the discharge. However, they still typically produce a full-energy spark at the other end of the wand. These are further unsatisfactory because (a) they require each occupant to possess, locate, and consciously manually deploy the portable device following each exit, (b) the eventual discharge happens at full voltage and energy, producing a relatively large spark, which is just as able to ignite gasoline-air vapors as a spark generated without such a device, and (c) since the location of deployment is not controlled, the hazard of fire may not be consistently reduced, because a spark may inadvertently occur near the vehicle's fuel filler tube.

Beaty (above) disclosed a method that requires no new equipment or vehicle modification, and which may be used to suppress body charging and the subsequent ESD associated with exiting a vehicle; he suggested training occupants to grasp the metal edge of the vehicle door or the chassis as they exit. This method is not satisfactory for a host of reasons: (a) people are not generally amenable to training and behavior modification, no matter how trivial it may seem, (b) it may not be convenient, or even possible, for some occupants to reach far enough away from their seated position to grasp the door, once it is opened, but before they arise from their seats, (c) paint may insulate the occupant from the chassis until he or she emerges from the vehicle, and, worse of all, (d) because the metal edge of the door is forcefully mated with the car body when the door is finally closed, this technique may precipitate accidents in which fingers are badly injured—the edge of a car door is a very hazardous thing to wrap one's fingers around.

Crane, Nakamura et al., Rankilor, and Mann (above) disclosed the use of a grounded conductive pad in a specially designated, fixed location that must be deliberately touched by the occupant during or after egress. This is not satisfactory for many of the reasons given above.

Prior art devices in the third group are intended to reduce human body charging, but do not require conscious action in order to be effective; regardless, these designs all have disadvantages.

Simon, et al., and Demott (above) disclosed the use of antistatic treatment of seat materials to attempt to prevent triboelectric charging on the seats. In another approach, Hunt, Allder, and Nutter (above) disclosed metallic threads that are woven through the seats and galvanically bonded to the vehicle chassis. Azbill, Adams, and Lankow (above) disclosed conductive bands and seat covers that may be placed over seats. Chubb experimented with conductive fibers woven into seat materials in an attempt to mitigate body charging, and demonstrated that charging could be significantly reduced using these methods. McQueen et al., in US 2008/0246296 A1 assigned to General Motors (above), disclosed a similar strategy. U.S. Pat. No. 8,422,191 issued to McEnhill et al., and assigned to the Honda Motor Co. (above), teaches the substitution of conductive polymers for the previously suggested metallic threads. Inexplicably, the measured ESD spark energies cited by McEnhill et al. are in error by as much as 3 orders of magnitude, and, in fact, exceed the maximum permissible capacitive stored energy limits of safety standards, such as ANSI/ISA-61010-1, by a factor of 100.0; electrical shocks in this energy range would commonly be categorized as dangerous and possibly lethal, and are in the range of the shock energies generated by defibrillators. These errors may call into question the credibility of the balance of McEnhill's test data.

Regardless, McEnhill's designs, as well as those of Hunt, Allder, Nutter, Azbill, Adams, Simon et al., and Demott have the significant drawback that the special conductive or antistatic construction is employed indiscriminately across the seating surface. The conductive material in their disclosures is applied to both left and right sides, as well as the middle, in some many cases, of a vehicle seat cushion. In other words, the inventors specify no preferred location on the seating surface for the special construction, so that the seat design will be bound by the constraint of requiring the use of special material across large areas of the seating surface, ultimately increasing production cost significantly. Therefore, these methods are not desirable.

United Static Control Products and Beaty (above) disclosed spraying an anti-static liquid on vehicle seats. One disadvantage of this is that such treatment requires the application of a relatively large quantity of anti-static liquid. Another disadvantage is that it may cause the seats to feel slippery, especially after repeated treatments. Furthermore, it may cause contamination of clothing. Finally, this treatment may or may not be effective, depending on the seat construction and the type of fabrics in the clothing being worn by occupants. Therefore, this method is not desirable.

Lippy and Lee (above) suggested deploying a conductive, chassis-connected steering wheel and a conductive steering wheel cover, respectively; but often, the steering wheel will not be the last thing touched before a person's body finishes separating from the vehicle seat, so this method is not satisfactory. In DE 19745869, assigned to Volkswagen (above), Schumann et al. disclosed a conductive door handle, electrically bonded to the vehicle chassis, that could be used to discharge the occupant. Sutherland and Signorino (above) disclosed similar designs. These are unsatisfactory because they require that occupants be trained to grasp a door handle before they begin to arise from their vehicle seat, and to maintain that grasp as they arise. Even if occupants were amenable to such behavior modification, it may not be convenient, or even possible, for some occupants to reach far enough away from their seated position to grasp a door handle once the door is opened, let alone maintain that grasp as they begin to arise. To evaluate the suitability of the chassis-connected conductive door handle, people were observed exiting their cars on the main street of a local town, to see what parts of the vehicle they tended to touch when leaving their seats. It was observed that about 40% held and leaned on the interior door handle, about 40% first shoved the door wide open, and then exited by sliding out without touching anything with their hands, and about 20% held the edge of the door while exiting. These observations show that a grounded door handle, by itself, would not provide any protection from ESD for that significant proportion of occupants who "shove the door open", unless those occupants were trained to modify their behavior and somehow grasp the door handle while exiting.

In addition, Signorino's design has the disadvantage of inexplicably requiring a "capacitive bipolar element" or "storage cell" in the path between the conductive handle and the chassis; Signorino's design is therefore further unsatisfactory because it includes unneeded components and complexity, which unnecessarily increases vehicle cost.

Therefore, to increase the chances of successful comprehensive ESD mitigation across the entire consumer population, and to eliminate the need for behavior modification, as well as to eliminate unduly difficult, awkward, or unnatural egress procedures, it is necessary to employ a less expensive mitigation device whose operation does not depend upon what the occupant touches with his or her hands during egress.

BRIEF SUMMARY OF THE INVENTION

To alleviate the problem of triboelectric charging of occupants as they exit their vehicles during dry weather, and the consequential unpleasant electrical shocks and potentially deadly incendiary sparks due to ESD, a system is disclosed for mitigating ESD.

A first embodiment comprises a narrow conductive electrode that is applied to that one edge of a seat cushion which is closest to the door nearest the seat, and that is galvanically connected to the vehicle chassis. For example, this edge will normally be the left edge of the driver's seat, or the right edge of the front passenger's seat, in a sedan manufactured for use in the United States. This particular seat edge will typically be the last part of the seat to contact an occupant's body when his or her body separates from the seat. The electrode is substantially located on a normally unoccupied surface of the seat cushion. A unique advantage of this embodiment over all prior art seat-mounted devices that incorporate grounded electrodes is that it may be produced at a lower cost and with less design constraints, because a relatively small amount of conductive material is selectively applied to that critical area that provides the most benefit. Further, because of its placement, orientation, and thin blade shape, it tends to increase the electric field at the most important time and location—the instant that the occupant's body is just separating from the seat, on the edge of the seat nearest the nearest door—thereby promoting more effective discharging of a person during egress. Certain methods may allow a manufacturer to easily retrofit an existing seat design with an electrode by simply adding a manufacturing step.

Other embodiments further include pointed shapes on the electrode to increase the electric field intensity, which may promote more complete discharging of a person during egress.

As will be explained below in more detail, the embodiments tend to discharge the human body whilst its charge distribution still has relatively low voltages and low energies. Consequently, any sensation of being shocked during the discharging process is mitigated. Once a person has been discharged by the embodiments, subsequent painful ESDs that might otherwise have been occasioned by, for example, touching the vehicle, are mitigated. The risk of fire during refueling is also reduced because the energies of any ESD sparks produced by the embodiments tend to be lower than would otherwise occur. Furthermore, these sparks, if any, tend to occur near the seats, far from the fuel tank filler tube, where volatile and dangerous air-fuel mixtures tend to collect. Finally, the energy of any residual charge on a person, after egress, is greatly reduced by the embodiments, as will be shown in the test results below.

BRIEF DESCRIPTIONS OF THE DRAWINGS

FIG. 3 is a plan view of the electrode of FIG. 1;

FIG. 3A is a cross-sectional view of the electrode of FIG. 3;

FIG. 3B is an expanded cross-sectional view of one edge of the electrode shown in FIG. 3A;

FIG. 4 is a plan view of an alternate embodiment of an electrode with serrations;

FIG. 4A is a cross-sectional view of the electrode of FIG. 4;

FIG. 4B is a plan view of an alternate embodiment of an electrode with laterally staggered serrations;

FIG. 5 is a plan view of an alternate embodiment of an electrode with raised points;

FIG. 5A is a cross-sectional view of the electrode of FIG. 5;

FIG. 5B is a plan view of an alternate embodiment of an electrode with laterally staggered raised points;

FIG. 6 is a plan view of an alternate embodiment of an electrode constructed with conductive wires or threads;

FIG. 6A is a cross-sectional view of the electrode of FIG. 6;

FIG. 6B is a plan view of an alternate embodiment of an electrode constructed with conductive wires or threads having laterally staggered tips;

Figure 9:
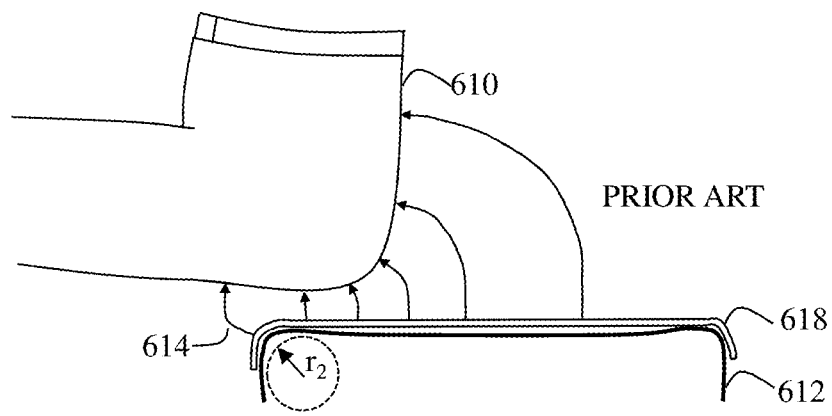
Figure 10:
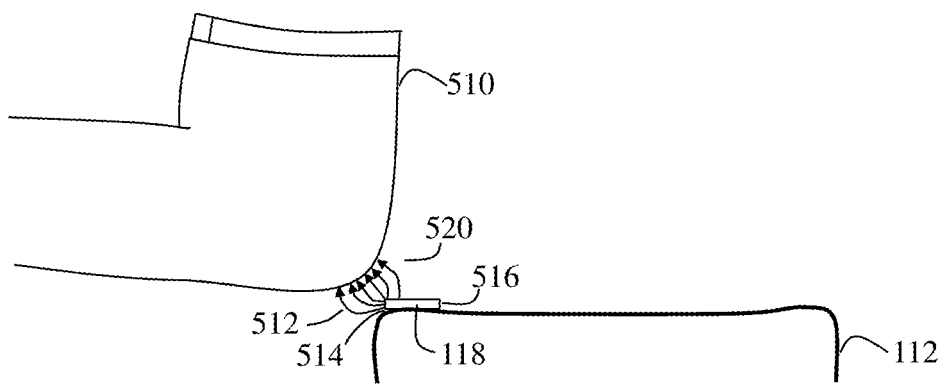

FIG. 9 is a view from the rear of a vehicle of a seat cushion with a prior art electrode, a person egressing sideways from the vehicle, and the electric field lines between the electrode and the person; and FIG. 10 is a view from the rear of a vehicle of a seat cushion with an electrode, a person near completion of egressing sideways from the vehicle, and the electric field lines between the electrode and the person that show the effect of a thin blade electrode geometry.

REFERENCE NUMERALS 110 back cushion
112 seat cushion
114 seat
116 seat mounting base
118 electrode on edge of seat cushion, near closest door
120 door
126 vehicle
130 floor
210 tire
212 wire
214 steering wheel
216 optional resistor
218 electrical ground point
220 seating area
222 unoccupied area
224 outboard edge of seat
310 electrode with serration
312 pointed serration
314 electrode with raised points
316 raised point
318 electrode with narrow conductors
320 common conductor
322 tip conductor
324 short tip conductor
326 short pointed serration
328 offset raised point
330 terminal end
r 1effective radius of curvature of electrode edge
510 person, partial view of upper legs
512 electric field or electric flux streamlines
514 outboard edge of electrode
516 inboard edge of electrode
520 air gap
d air gap distance
610 person, prior art
612 seat cushion, prior art
614 electric field or electric flux streamlines, prior art
618 prior art electrode
r2 effective radius of curvature of electrode edge, prior art

DETAILED DESCRIPTION OF THE INVENTION

The embodiments operate by the principle of providing a new conductive path for accumulated charges to flow through, so that they may recombine with opposite-polarity charges in the vehicle, the human body, or the earth, in a relatively benign manner. The recombination takes place just as a person's body is separating from a vehicle seat, while the energy of the charge distribution is still low, and at a safe location—away from the gasoline filler tube of the vehicle. The embodiments take advantage of the fact that, owing to gravity and the limited height of vehicle ceilings, an adult occupant's body almost always slides over the outer edge of a seat towards a door opening as he or she exits.

First Embodiment—Electrode on the One Edge of Seat Next to Closest Door

Figure 1:
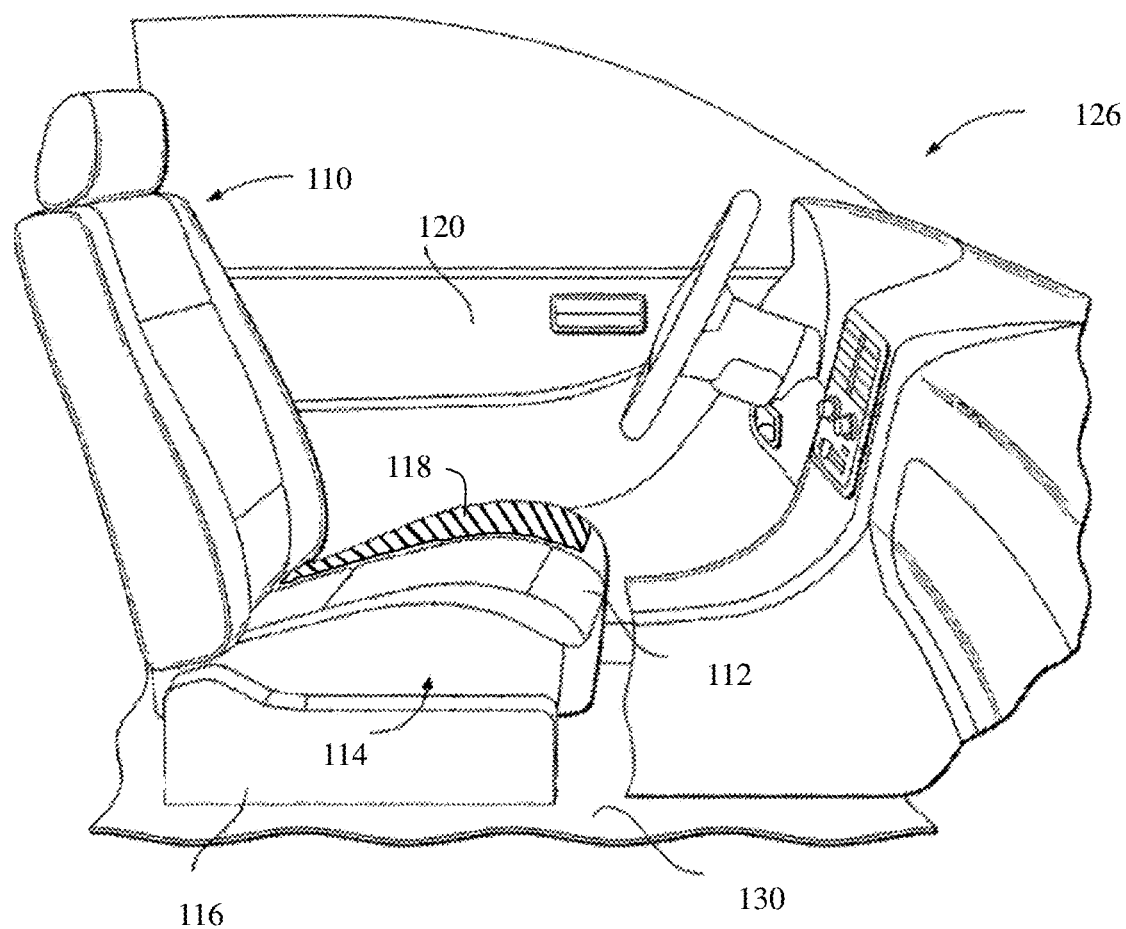
FIG. 1 is a view of a vehicle interior that shows a chassis-connected electrode disposed on the seat cushion of a vehicle seat, in accordance with an aspect of the present invention.
Figure 2:
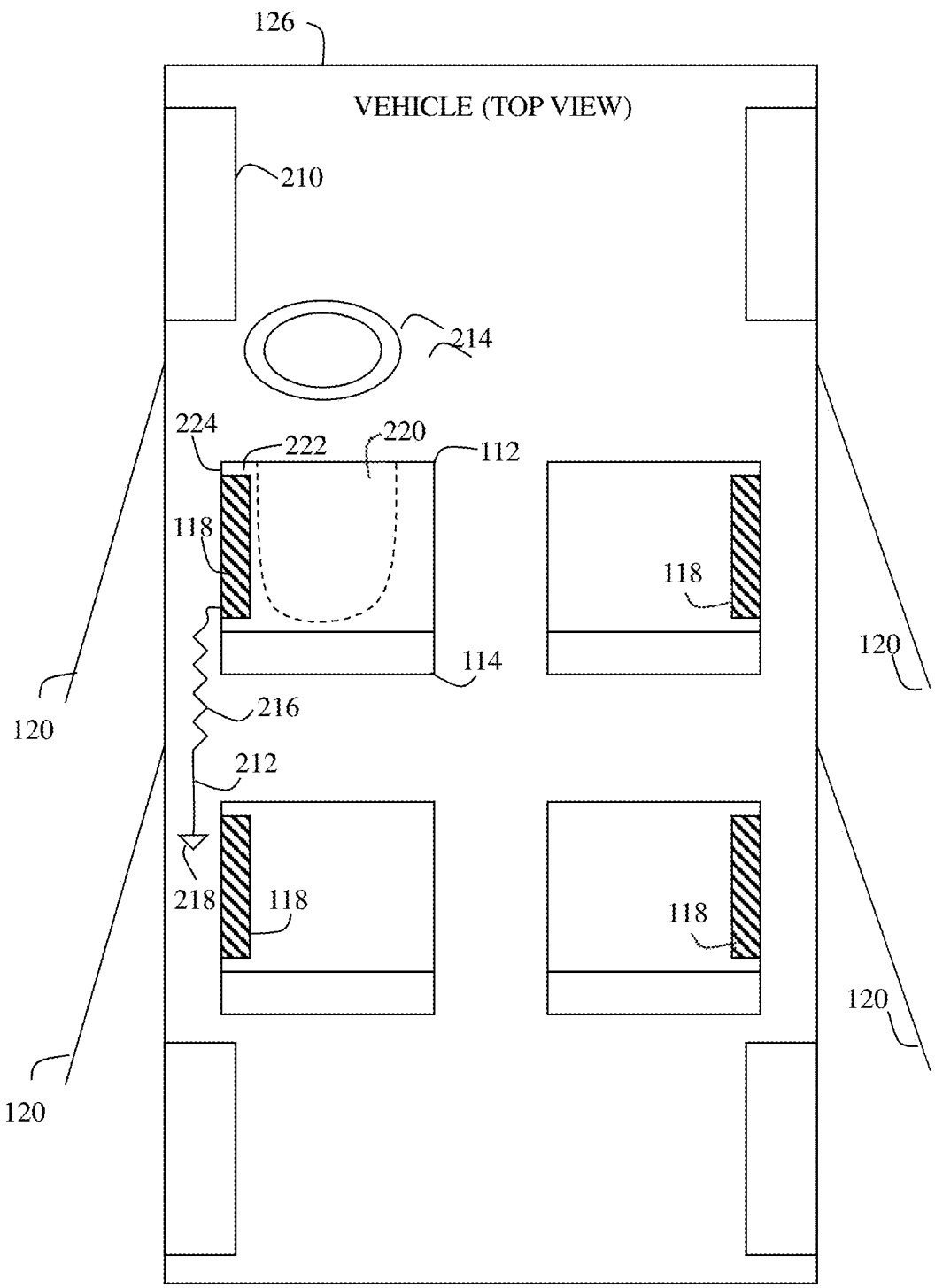
FIG. 2 is a plan view of the interior of the vehicle of FIG. 1, showing electrodes on four seats in the vehicle.

Referring to FIG. 1, in an exemplary embodiment, a conductive discharge path is provided by locating a chassis-connected electrode 118, indicated by the hatched area in the figure, on the upper surface of seat cushion 112, on the edge of seat 114 that is next to the nearest vehicle door 120. Referring to FIG. 2, on the left side of a vehicle, the edge of seat 114 next to the nearest vehicle door 120 is outboard edge 224; whereas on the right side of the vehicle, the outboard edge is the right edge. Outboard edge 224 is the most critical and effective location for an electrode used for the purpose of mitigating the subject ESD, since it is typically the very last part of the seat surface that occupants' legs or buttocks touch when exiting a vehicle. In other words, unless an occupant is so short that he is able to stand up and walk by the seat to exit the vehicle, he is bound by gravity to slide his bottom over the outer (or door-facing) edge of the top surface of the lower portion of seat cushion 112 as he exits. Any electrode surfaces placed at locations closer to the center of the vehicle, as for conventional designs, have marginal utility at best, since final separation between an exiting occupant's body and seat cushion 112 does not occur at these locations; therefore, any discharging at these locations may be followed by more charging as egress progresses with conventional designs. Furthermore, covering a greater portion of seat cushion 112 with electrode material may actually degrade the discharging action by reducing electric field intensity, as explained below.

Electrode 118 may comprise a narrow, substantially flat conductive strip. The unique design and placement of this strip may allow electrode 118 to define an area less than 50.0 square inches. Alternately, in another embodiment, electrode 118 may define an area less than or equal to about 26.0 square inches. In another embodiment, a total area of the electrode 118 may be even smaller, that is, less than or equal to about 10.0 square inches. Referring to FIG. 2, electrode 118 is preferably galvanically connected to electrical ground point 218 by one or more of an electrically conductive wire 212 (as shown), conductive fasteners (not shown), conductive plastic parts (not shown), or any other conventional electrically conductive connections. Optional resistor 216 may be employed in series, between electrode 118 and electrical ground point 218, to increase the resistance of the electrical path to chassis ground, as explained below.

Electrode 118 is sized and configured to ensure that a thigh or posterior region of a person contacts electrode 118 in the process of exiting vehicle 126, and that electrode 118 remains in contact with the person until his or her final separation from seat cushion 112. As shown in FIGS. 1 and 2, electrode 118 may be substantially rectangular, having a length approximately that of seat cushion 112 (i.e., from back to front), and extending from an outboard edge 224 of seat cushion 112 (i.e., near door 120) a predetermined distance onto seat cushion 112.

Unless a person is extremely obese, the individual typically occupies a seating area 220 that is smaller in extent than the area of seat cushion 112. An unoccupied area 222 of the seat cushion may be defined as a seat region located between seating area 220 of an individual and outboard edge 224 of seat cushion 112. The unoccupied area 222 is normally exposed, and not covered by the seated individual. Accordingly, electrode 118 is sized and configured as a narrow strip to fit into unoccupied area 222, and to not extend into seating area 220 of the seat cushion 112. This configuration serves to provide an electrode having a minimal surface area so as to increase the electrical field strength on the electrode 118 to more effectively discharge the triboelectric charge produced by the individual upon exiting. In an exemplary embodiment, electrode 118 may be approximately ten to fifteen inches long, and approximately one to two inches wide.

Hence, the application of a narrow electrode 118 on the upper surface of seat cushion 112, near outboard edge 224 of seat 114 has, at least, two important advantages over prior art. First, electrode 118 may be produced at a lower cost and with fewer constraints than conventional designs, because only a relatively small covering (i.e., surface area) of conductive material is selectively applied to that seat region that will produce the most benefit. Most benefit is realized by providing conductive electrode material on the relatively small area near outboard edge 224. Again, this is the portion of the seat that an occupant's posterior consistently touches last during egress.

Secondly, the geometries of the electrodes of the embodiments may promote more complete discharging of a person than for prior art designs. It is well known that, although voltage is substantially constant over a conductive object, increased electric field strength occurs near sharp geometrical features on a such an object. All of the embodiments may benefit from this effect, as will now be explained.

FIG. 3 shows electrode 118 with a basically rectangular shape, as an example of a first embodiment. A cross-section of electrode 118 is shown in FIG. 3A. The required galvanic connection to the vehicle chassis is not shown for clarity of illustration. Referring again to FIG. 3, an overall aspect ratio of the electrode may be defined as the length l of the electrode (with length l defined as the distance from the end of the electrode nearest the front of the vehicle to the end of the electrode nearest the rear of the vehicle) divided by the width w of the electrode (with width w defined as the distance from the edge of the electrode nearest the left side of the vehicle to the edge of the electrode nearest the right side of the vehicle). As will be further explained below, to best increase electric field strength, while using minimal conductive material, it may be advantageous for the overall aspect ratio of the electrode to fall in the range of 2.0 to 40.0. In one embodiment of electrode 118, the length is approximately 13.0 inches and width is approximately 2.0 inches, such that the overall aspect ratio of the electrode is 6.5. Any other geometric shape with a similar overall aspect ratio, such as a long, narrow oval or triangle for instance, may be employed, provided that the electrode surface is substantially located near outboard edge 224 of seat 114. Furthermore, as can be seen from the plan and cross-section views of FIGS. 3 and 3A, respectively, electrode 118 has a thin, blade-like shape. This shape has a sharp geometrical feature at its edges, defined by a region of small radius of curvature. FIG. 3B, an expanded view of the electrode cross-section, shows that the electrode edge has an effective radius of curvature r1. Radius of curvature r1 may be 0.010 inches for a typical conductive fabric, for example. Electric charge tends to concentrate, and, consequently, electric field strength is intensified, at regions of small radius of curvature on conductors, such as the one shown in FIG. 3B. Deploying the edge of electrode 118 near outboard edge 224 of seat 114 provides an additional advantage over prior art, as will be explained below.

Figure 8:
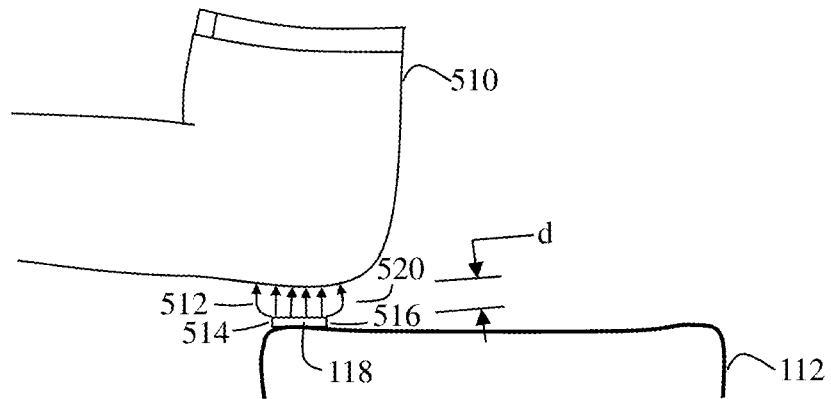
FIG. 8 is a view from the rear of a vehicle of a seat cushion with an electrode, a person egressing sideways from the vehicle, and the electric field lines between the electrode and the person.

FIG. 8 is a view from the rear of a vehicle of a seat cushion 112 with electrode 118 (both seen in cross-section), with person 510 exiting sideways from the vehicle. An air gap 520 between person 510 and electrode 118 is indicated. The effective air gap distance d between person 510 and electrode 118 is exaggerated in the drawing for clarity. When person 510 is unseated, air gap 520 may actually be visible, as shown. Even when person 510 is seated, air gap 520 between person 510 and electrode 118 may still be present due to a thickness of clothing worn by person 510, though the gap may be partially occupied by the material of the clothing. A group of electric flux streamlines 512 is shown occupying air gap 520. The electric flux streamlines 512 are presumed, as an example, to originate on six equal charges on electrode 118, and terminate on six equal and oppositely polarized corresponding charges on a person 510. The spacing of the streamlines is inversely proportional to electric field strength; that is, close streamline spacing corresponds to greater electric flux density and greater electric field strength. To simplify the analysis, any charge remaining on the insulating portion of the seat cushion surface is neglected here. Charge on person 510 will tend to concentrate near electrode 118, so a narrower electrode will tend to increase the electric field strength associated with the charge. Since electrode 118 is located near outboard edge 224 of seat 114 it will increase the electric field at precisely the most advantageous location for discharging an occupant's body. In contrast, as shown in FIG. 9, a wider prior art electrode 618 covers a relatively larger portion of a prior art seat cushion 612. The overall aspect ratio of this electrode is quite low, about 0.7. In this prior art case, the charge on person 610 tends to spread over a relatively larger area corresponding to the larger prior art electrode 618 conductor area, resulting in a lower electric flux density, and a lower electric field strength as is evident by the more widely spaced prior art electric flux streamlines 614. At the other end of the overall aspect ratio range, prior art electrodes that are too narrow, with too large an overall aspect ratio (greater than 40.0), suffer from a reduced likelihood of contact with person 610 at the moment of final separation from seat cushion 612.

Furthermore, in the conventional design of FIG. 9, the effective radius of curvature r2 of the conductive material geometry that is proximate to the body of person 610 at the final moment of separation of person 610 from seat cushion 612 is relatively large in comparison to the effective radius of curvature r1 of the conductive material geometry shown in FIG. 3B for the embodiment of FIGS. 3 and 3A. For example, whereas a typical value for r1 may be 0.010 inches, a typical value for r2 may be 1.000 inches. Consequently, the electric field strength associated with the conventional design of FIG. 9 tends to be relatively smaller (as indicated by the wider spacing of prior art electric flux streamlines 614 in FIG. 9), as compared to the embodiment of the present invention, as seen in FIG. 10. In FIG. 10, an outboard edge 514 and an inboard edge 516 of electrode 118 are indicated, and each has a relatively small radius of curvature, similar to that of FIG. 3B that was explained above. Charge tends to concentrate at outboard edge 514 of electrode 118 near opposite charge on person 510 at the instant of final separation of person 510 from seat cushion 112. Because outboard edge 514 has relatively small radius of curvature (which constitutes a sharp geometric feature), this concentration of charge at outboard edge 514 produces the even more closely spaced electric flux streamlines 512 of FIG. 10, and a correspondingly higher electric field strength, which facilitates dielectric breakdown of air gap 520 and discharge of person 510. In conventional designs, in which the location of the electrode edge is not carefully controlled, and may be closer to the middle of the seat cushion, or wrapped down onto the vertical side surface of the cushion (as shown in FIG. 9), the edge of the electrode is typically too far away from the person at the moment of separation to take advantage of this effect.

Hence, for a given charge, the combination of the location of electrode 118 at outboard edge 224 of seat 114, the use of electrode overall aspect ratio in the range of about 2.0 to about 40.0, and the relatively small radius of curvature r1 of electrode 118 at its outboard edge 514, allow electrode 118 to typically produce a higher electric field strength at the critical moment of separation of person 510 from seat cushion 112, thereby resulting in more complete discharging of a person with the embodiment than would a prior art design with an indiscriminately-placed prior art electrode 618 of indiscriminately-chosen overall aspect ratio, that may further have features of relatively large radius of curvature.

As disclosed above, the present invention promotes the discharge of an exiting person 510 as he or she slides over and separates from a vehicle seat cushion 112. In order for this discharge to occur, any intervening insulator or insulating material disposed between the electrode 118 and person 510, such as clothing or an air gap 520, should be overcome. For any insulator, dielectric breakdown will occur when the electric field strength E (units of Volts/meter) exceeds a predetermined breakdown level. Since, for a given charge q (units of Coulombs), electrode 118 will produce a higher electric field strength than does a conventional electrode (e.g., prior art electrode 618) that covers a wider area of seat cushion 112, electrode 118 can produce insulator breakdown and conduction at lower charge levels than for conventional devices, thereby producing more complete discharging of the exiting person 510 before he or she completes egress.

Electrode 118 may comprise a conductive fabric, a sheet metal, a preformed conductive plastic, rubber or metal, or any other material that is suitably conductive and durable. Electrode 118 may be formed as a thin sheet or strip of material that can be applied to, or sewn into, or fastened onto seat cushion 112. Electrode 118 may also be fabricated from a thicker material and embedded into seat cushion 112, as desired. In another exemplary embodiment, metal wires or conductive threads may be incorporated into the surface of the vehicle seat, and used as conductive elements connected to the vehicle chassis. Selective conductivity may also be achieved by applying a conductive paint or ink to seat cushion 112 to form the electrode, the application made by brushing, by spraying, by printing, by silk-screening, pad printing, or by any other conventional method; these alternatives may facilitate retrofitting an existing seat design with an electrode by simply adding a manufacturing step. The electrode may also be formed by hot stamping a conductive foil, a dry conductive polymer, or dry polymer ink, onto seat cushion 112; these alternatives may facilitate retrofitting an existing seat design with an electrode by simply adding a manufacturing step.

Second Embodiment—Electrode Including Serrations on the One Edge of Seat Next to Closest Door In a second embodiment, an electrode includes pointed shapes in its construction that further increase the electric field intensity, which may promote even more complete discharging, for the reasons described above.

FIG. 4 shows an example of this in which a substantially flat electrode 310 includes a plurality of pointed serrations, an example of which is pointed serration 312. A cross-section of electrode 310 is shown in FIG. 4A. Any of the construction methods and materials disclosed for the first embodiment may be used to fabricate electrode 310. Each pointed serration 312 serves to further increase the electric field for a given charge when positioned in the vehicle such that pointed serration 312 of electrode 310 preferably extends outward, towards the nearest vehicle door 120. Pointed serration 312 essentially incorporates the thin blade shape of electrode 118 of FIGS. 3 to 3B, but adds serrations with small radius of curvature, or points, in the plane of the thin blade, as shown in FIG. 4. Consequently, use of the electrode 310 may reduce a person's charge to an even lower level than for the rectangular-shaped electrode 118 with a straight edge. The pointed serration 312 may also extend to either left or right or even both directions (not shown). By extending pointed serration 312 towards the nearest vehicle door 120, the electric field strength may be maximized at the likely final point of contact with an occupant's body.

Third Embodiment—Electrode Including Raised Points on the One Edge of Seat Next to Closest Door FIG. 5 shows an electrode 314 comprising a preformed conductive strip with multiple conductive raised points 316. The raised points 316 may extend from about 0.1 inches to about 0.5 inches above the surface of seat cushion 112. A cross-section of electrode 314 is shown in FIG. 5A. Raised points 316 may be an integral portion of a molded assembly, wherein the entire electrode 314, including raised points 316, is preformed by molding a conductive polymer, conductive polymer foam, or other conductive material, such as a metal, into a single part. Because each raised point 316 has a relatively small radius of curvature at its tip, electrical charge concentrates at any raised point 316 in proximity to a charged person 510, and increases the electric field near person 510, in a similar manner to that of the other embodiments with sharp geometrical features, consequently reducing the charge buildup on person 510 more effectively.

Fourth Embodiment—Electrode Including Common Conductor and Tip Conductors on the One Edge of Seat Next to Closest Door FIG. 6 shows an electrode 318 comprising narrow conductors, including common conductor 320, and which may further include tip conductor 322 with terminal end 330. Here, narrow means that the width of conductors 320, 322 is such that the conductor length-to-width aspect ratio (length divided by width) of each conductor 320, 322 is greater than about 4.0. A cross-section of electrode 318 is shown in FIG. 6A, which illustrates that electrode 318 is substantially flat. Referring again to FIGS. 6, 6A and FIG. 2, common conductor 320 is routed along unoccupied area 222, near outboard edge 224 of seat cushion 112. A plurality of substantially perpendicular tip conductors, an example of which is tip conductor 322, may be added, again for the purpose of increasing the electric field. Tip conductor 322 may have a length in the range of about 0.2 inches to about 3.0 inches. Tip conductor 322 is configured to define a terminal end 330 disposed near outboard edge 224 of the seat cushion 112 which essentially constitutes a pointed electrode. One or more tip conductors 322 may extend to either left (as shown in FIG. 6) or right (not shown), or even both directions from common conductor 320 (not shown); extending towards the nearest door may maximize electric field strength at the likely final point of contact with an occupant's body. Electrode 318 may be constructed using an array of wires or conductive thread that may be sewn, woven, or otherwise incorporated into surface of seat cushion 112. If wires are used, it may be advantageous to assure that the wire ends are buried in the cushion material, to avoid catching on clothing. In another embodiment, electrode 318 comprises a pattern with the geometry indicated in FIG. 6 printed onto the surface of seat cushion 112 using conductive ink or conductive paint. In still another embodiment, electrode 318 may be hot stamped as a pattern, using dry conductive polymer, dry conductive ink, or conductive foil, onto the surface of seat cushion 112. The unique design of electrode 318, given the tip spacing specified below, may allow electrode 318 to be implemented with a much smaller amount of conductive material than for prior art electrodes. The total length of wire, thread, or printed or hot stamped conductor comprising electrode 318 may be about 60.0 linear inches or less. Furthermore, for a printed or hot stamped conductor width of 0.050 inches, common conductor 320 length of 13.0 inches, tip conductor 322 length of 2.0 inches, and tip spacing of 1.0 inch, for example, the total area of conductive material comprising electrode 318 on each seat 114 would be only 2.1 square inches (equivalent in area to that of a 1.4 inch×1.4 inch square). This area, when multiplied by the relatively small thickness of a printed ink or hot stamped foil of 0.003 inches, for example, would result in a total volume of electrode conductive material of only 0.006 cubic inches per seat (equivalent in volume to that of a cube with edge length of 0.181 inches).

FIG. 6B shows a variation of electrode 318 with alternating use of tip conductor 322 and short tip conductor 324; this configuration has an advantageous aspect of providing a wider lateral range of final point of contact of terminal ends 330 with an exiting person 510, because the terminal ends 330 of tip conductors 322 and short tip conductors 324 are staggered laterally. In this context, laterally means in a direction that traverses the width of the vehicle, as opposed to a direction that traverses the vehicle from front to back or back to front. This staggered tip placement is not limited to electrode 318; it may be applied in a like manner to other electrode constructions. For example, FIG. 4B shows electrode 310 with the points of the serrations laterally staggered by alternating use of pointed serration 312 and short pointed serration 326, and FIG. 5B shows electrode 314 with the raised points laterally staggered by alternating use of raised point 316 and offset raised point 328. Referring again to electrode 318 in FIG. 6B, laterally staggering terminal ends 330 by alternating use of tip conductor 322 and short tip conductor 324 not only provides a wider lateral range of final point of contact with exiting person 510, but may also reduce the amount of conductive material needed to manufacture electrode 318. For example, for a printed or hot stamped conductor width of 0.050 inches, common conductor 320 length of 13.0 inches, tip conductor 322 length of 2.0 inches, short tip conductor length of 1.0 inches, and tip spacing of 1.0 inch, the total area of conductive material comprising electrode 318 on each seat would be only 1.6 square inches (equivalent in area to that of a 1.26 inch×1.26 inch square). This area, when multiplied by the relatively small thickness of a printed ink or hot stamped foil of 0.003 inches, for example, would result in a total volume of electrode conductive material of only 0.0048 cubic inches per seat (equivalent in volume to that of a cube with edge length of 0.169 inches).

GENERAL DISCUSSION OF EMBODIMENTS

Referring to FIGS. 4 through 6B, and FIG. 10, for a given electrode with pointed shapes, two considerations affect the choice of the optimal spacing of electrode tips such as pointed serrations 312, raised points 316, or tip conductors 322. The same two considerations apply to the spacing of staggered tips such as pointed serrations 312 to short pointed serrations 326, raised points 316 to offset raised points 328, and tip conductors 322 to short tip conductors 324. Therefore, for the purpose of the following discussion, reference will be made to electrode 318 in FIG. 6, but the discussion applies similarly to all of the electrodes shown in FIGS. 4 through 6B. Firstly, regarding electrode 318, if more than one tip conductor 322 with terminal end 330 is in close proximity to a person 510, the electric field strength near any tip conductor 322 or terminal end 330 depends on the number of tip conductors 322 in proximity to person 510; in general, for a given body charge, the very highest electric field will be generated when the lowest number of tip conductors 322 is in proximity to person 510. Nonetheless, the number of tip conductors 322 may be increased (and the spacing between adjacent terminal ends 330 reduced) without a significant penalty in electric field strength, until the tip-to-tip spacing approaches the tip-to-person spacing. Secondly, and in opposition to the first consideration, the number of tip conductors 322 must be high enough so that at least one tip conductor 322 is likely to be close to the location of the last point of contact of person 510 with vehicle seat cushion 112 during any egress, i.e., there must be adequate spatial sampling. Given that the tip-to-person spacing may vary considerably, depending upon the clothing worn, and that the location of the final point of contact may also vary considerably, a range of tip spacing that provides an advantageous trade off between the two conflicting considerations is about 0.2 inches to about 2.0 inches.

Any cluster of interconnected smaller shapes may be also be employed, provided that the electrode surface is primarily located on outboard edge 224 of seat cushion 112.

Referring to FIGS. 1, 2, and 3, electrode 118 may incorporated as part of seat cushion 112 by sewing a conductive fabric onto outboard edge 224 of seat 114, as mentioned earlier. Electrode 310, seen in FIGS. 4 to 4B, may be constructed and fastened in a like manner. Alternatively, electrodes 118, or 310, or electrode 314 (shown in FIGS. 5 to 5B) may be fastened to seat cushion 112 using adhesive, or any other conventional fastening mechanism, such as zippers, Velcro®, snaps and the like. Electrode 118, or 310, or 314 may be fastened on all of its edges and thereby incorporated into seat cushion 112, or it may be attached by one edge as a loose flap. If electrode 118, 310, or 314, or electrode 318 (shown in FIGS. 6 to 6B) is to be permanently affixed in an additional manufacturing step, electrode 118, 310, 314, or 318 may be available as an optional item. If electrode 118, 310, or 314 are to be fastened by the removable means mentioned above, electrode 118, 310, or 314 may be provided as an aftermarket item or a consumable part or replacement part.

Finally, any of the geometric patterns shown in FIGS. 3 through 6B may be used to provide a visually distinctive design, if their presence is emphasized by the use of a contrasting color. This might prove useful in marketing, in that it will help customers to recognize the feature in automobile dealer showrooms.

Testing and Test Results

Several researchers have published test results relating to the mitigation of ESD by the use of chassis-connected conductive seating surfaces. AlphaLab, Inc. (above) disclosed that it may not be possible to completely eliminate body charging by using chassis-connected conductive seating surfaces alone, in testing that showed that charging may occur even when polymers separate from metal surfaces, such as gold, silver, aluminum and steel. Chubb (above) experimented with conductive fibers woven into seat materials in an attempt to mitigate body charging, and, in an extreme measure, even tried lining seats with metal foil. His results suggested that, although body charging could be significantly reduced by using chassis-connected conductive seating surfaces, body charging was not completely eliminated. Pratt (above) disclosed that even when two items of ostensibly identical material are separated, charging may occur due to surface contamination and asperities.

Figure 7:
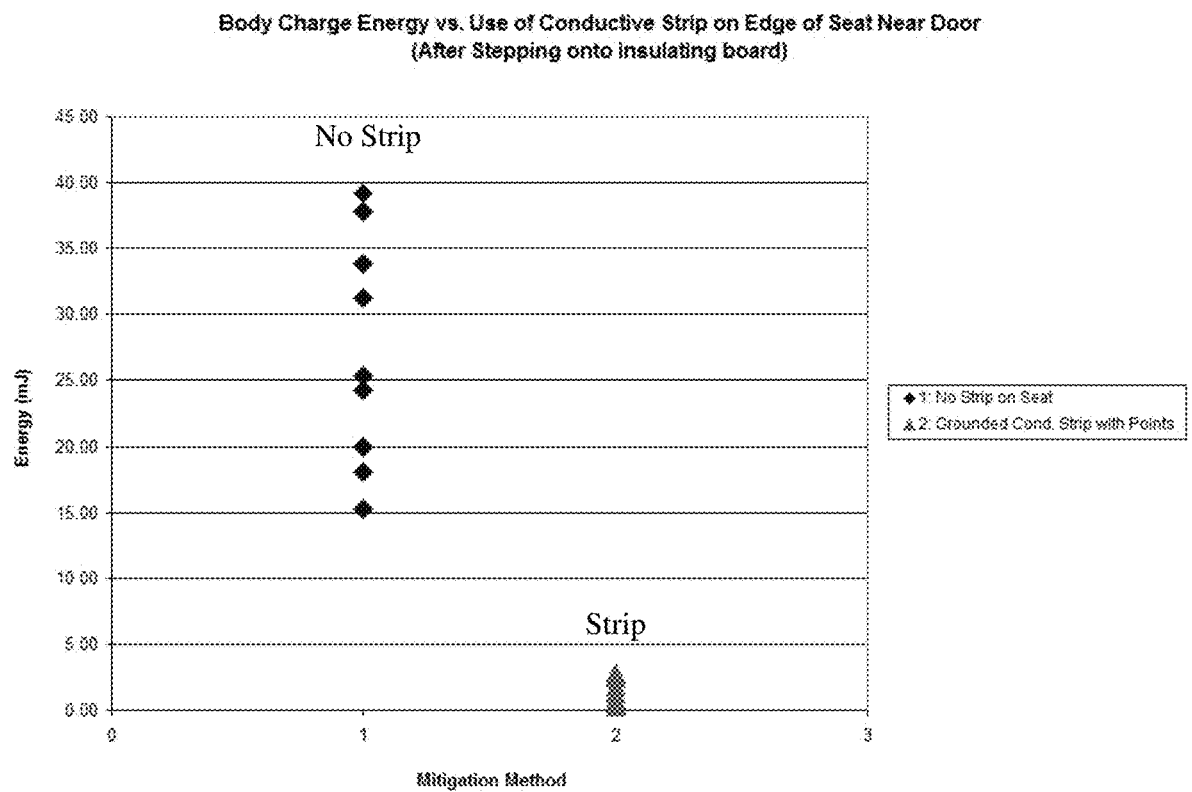
FIG. 7 is a scattergram plot of test results that show the effect of using an electrode that is located on the seat cushion, on the edge of the seat next to the nearest door.

In light of these reports, it was apparent that field tests were needed to quantify the effectiveness of the present invention electrodes described herein. In numerous field tests, a conductive fabric was cut into a strip with the serrated shape shown in FIG. 4 to create electrode 310. Electrode 310 was fastened to the top surface of the horizontal portion of a vehicle seat cushion 112 at outboard edge 224 of seat 114 using double-sided carpet tape, on the edge of the seat nearest the closest vehicle door, with pointed serrations 312 directed towards that door. Electrode 310 was 13.0 inches long, with an effective width of approximately 2.0 inches, and with an effective area of 26.0 square inches. Electrode 310 was electrically connected to electrical ground point 218 by connecting electrode 310 to the vehicle chassis with a copper wire 212. For each data point, a subject's body voltage was measured with an ACL Model 300B electrostatic field locator after the subject arose from a vehicle seat and stepped onto an insulated surface. During all tests the test subject wore a jacket with a 55% raime, 45% cotton exterior shell. Raime is a bamboo fiber blend; results obtained with woolen jackets were found to be similar to those obtained with raime. Energies were calculated based upon the measured voltage and a capacitance of 100.0 pF. The results of tests conducted with and without electrode 310 are shown in FIG. 7. In FIG. 7, the column of data points labeled "Strip" were obtained with electrode 310 in use; the column of data points labeled "No Strip" were obtained without any electrode. It can be seen that use of electrode 310 at outboard edge 224 of seat 114 causes a considerable reduction in human body charge energy. The energy reduction factor ranged from a minimum ratio of 5.0 to a maximum ratio of 126.0, depending on the data points considered, with an average reduction ratio of about 15.0.

The conductive fabric used for the conductive strip in testing comprised a Sparkfun P/N DEV-10056 swatch that had a resistivity of <1.0 Ω/square, but this is not intended to represent an optimal design choice—it was simply a readily available sample. A wide variety of conductive fabrics are commercially available, and the conductive fabric industry is fairly mature; some companies have been manufacturing conductive fabric for more than 60 years. To name a few examples of fabrics: the Belltron line is made by KB-Seiren Ltd. INNTEX makes a Kevlar/stainless steel fabric. Other fabrics include Atlantis and the 'Lectrolite® series made by Herculite®, some of which cost about $5.00 per square yard, in small quantities. Stainless steel fibers include Bekinox, Brunsmet and Naslon. Fibres that are partially metal include X-Static, Flectron and Texmet. Fibres containing metal oxides include Belltron 632, Belltron 638 and Megana-E. Fibres containing conductive metal salts include R-Stat, Thunderon, Nitril-Static, Bemberg, Conflex C, Conflex V and T-25. Fibres containing carbon include Viscostat, Resistat, Antron II, Antron III, Nomex Delta A, Negastat, No-Shock and Belltron. Fibres based on silver include Shielded® Fiber by Statex®, and X-STATIC by Noble Biomaterials. Other conductive fibres that use carbon include Epitropic™ and Clacarbo™. A trade organization that promotes the use of conductive fibres and fabrics is the Conductive Fiber Manufacturers Council.

A chassis-connected electrode 118, 310, or 318 may alternately be mounted lengthwise on the side of seat cushion 112, next to door 120. This will allow an edge of electrode 118, or pointed serration 312 of electrode 310, or terminal end 330 of electrode 318 to extend up to the horizontal plane of the seating surface to contact an occupant as he or she exits a vehicle. An additional electrode 118, 310, 314, or 318 may be fastened to back cushion 110 on its door-side edge, in a similar manner to that described above for seat cushion 112. Finally, electrode 118, 310, 314, or 318 may be applied to multiple seats in the vehicle, as indicated in FIG. 2 by the hatching on the other three seats.

The embodiments have the advantage that they will act to reduce almost all occupants' charge to some extent, regardless of what, if anything, they touch with their hands while exiting the vehicle, since they are bound by gravity to contact the outer edge of the seats with their legs just before exiting. In addition, the effectiveness of the embodiments does not depend upon the condition of the surface upon which the vehicle rests.

The novel aspect of the present embodiments is the deployment of an electrode at that critical, normally unoccupied area of a seat that will produce maximum effectiveness. This allows a seat designer to omit most of the conductive material used in prior art, while providing similar or improved discharging.

CONCLUSION, RAMIFICATIONS, AND SCOPE

Although it is now known that most ESD that causes discomfort to vehicle occupants as they exit their vehicles is produced by triboelectric charging of the human body, it was initially incorrectly assumed that the cause of the subject ESD was vehicle charging while driving during dry winter weather. To test that initial hypothesis, on a winter day, a vehicle was driven for a couple of miles and then stopped. The vehicle's voltage was measured using an ACL Model 300B electrostatic field locator, and was found to be surprisingly low—the vehicle voltage with respect to the earth was consistently <100.0 V. However, it was observed that a test subject's body voltage typically rapidly increased from an initial value of about zero to several thousands or tens of thousands of volts each time the subject arose from the vehicle seat. This was due to triboelectric charging that occurred when the subject's clothes, made of one material, contacted and separated from the vehicle seats, which were made of a different material. This observation led to the development of the embodiments disclosed herein.

Although unlike charges are produced whenever two dissimilar materials touch, the voltage and the energy of the associated charge distribution are close to zero as long as the two materials remain touching or close to one another. However, energy is imparted to the charge distribution, and the voltage of the charge distribution is increased, when the unlike charges are mechanically moved apart from each other against the attractive coulomb force, as the two materials are separated. This aspect may be illustrated by mathematical analysis of a simple parallel plate capacitor, which is an approximate model for a person that is very close to a vehicle or the ground. The well-known equations for capacitance, voltage, and stored energy for an ideal parallel plate capacitor are:

$$C = \frac{\varepsilon A}{d} \quad (1)$$

$$V_c = \frac{q}{C} \quad (2)$$

$$E_c = \frac{1}{2}CV_c^2 = \frac{1}{2C}q^2 \quad (3)$$

If such a capacitor is first charged, and the plates are then disconnected or insulated so that there are no paths by which the charge may leak away, the charge q will be constant. If the plates are then pushed apart so that the plate separation d is increased by, for example, a factor of 2, in Eqn. 1 the capacitance C will decrease by a factor of 2, and, consequently, in Eqn. 2 the voltage $V_c$ will increase by a factor of 2. It can be seen by inspecting Eqn. 3 that the increased plate separation will also cause the stored energy $E_c$ to increase by a factor of 2. Although this model is too simple to be very accurate for this application, and will become less accurate as the distance between the person and the vehicle increases, it clearly illustrates that the voltage and stored energy of a charge distribution increase as the distance between the unlike charges is increased, and that, at least for small separations, the voltage and energy tend to be proportional to the distance between the unlike charges.

Hence, the ultimate source of most of the ESD spark energy that shocks individuals during egress from vehicles is human muscle power. That is, a small portion of the mechanical energy that a person expends while arising and exiting a vehicle is converted into electrostatic energy when he or she forces unlike charges apart from each other against the Coulomb force. The greater the distance of charge separation, the greater the stored energy. This principle has actually been frivolously employed by Beaty in a prank to maximize his body voltage before shocking unsuspecting victims with an ESD, by jumping into the air before touching his victim. The principle was verified experimentally by having a subject, after first being charged to a certain initial voltage, step up onto an insulating bucket, thereby increasing the subject's distance from the earth; while standing on the bucket the subject's body voltage was significantly higher than while standing on the ground.

These topics are relevant because an advantage of the embodiments disclosed in this application is that they tend to discharge the human body before the body and its associated charge move very far away from the corresponding opposite charge left behind on the surfaces of a vehicle. Consequently, any discharges that do occur tend to happen at a relatively lower voltage and energy, and the sensation of being shocked is typically mitigated. The risk of fire during refueling is also reduced, not only because of the lower spark energies, but also because of the likely location of the sparks. Volatile and dangerous air-fuel mixtures typically collect near the filler tube while a vehicle is being refueled. Any sparks that occur in the operation of the embodiments occur at locations that are remote from the fuel tank filler tube—that is, at the vehicle seats.

All of that notwithstanding, it may be appreciated that a goal of the invention is to minimize the quantity of charge q (units of Coulombs) on a person after he or she has separated from a vehicle. This is accomplished, in part, by the use of an electrode of relatively small area that actually tends to increase the electric field strength, and voltage difference, associated with any charge, at the time and place of separation of a person from the seat cushion. This increased field strength will help to breakdown any insulator or air gap between a person's leg and the electrode on the seat cushion. This aspect may be again be illustrated by analysis of the simple parallel plate capacitor, the equations for which were given above. As before, a person's body forms one plate of the capacitor, and the chassis-connected electrode forms the other plate.

If such a capacitor is charged, and the plates are then disconnected or insulated so that there are no paths by which the charge may leak away, the charge q will, once again, be constant. If the plates are then reduced in area so that the plate area A is increased by, for example, a factor of 2, in Eqn. 1 the capacitance C will decrease by a factor of 2, and, consequently, in Eqn. 2 the voltage $V_c$ will increase by a factor of 2. Although, again, this model is too simple to be very accurate for this application, and neglects the unequal areas of the two plates in the application, it clearly illustrates that, for a given charge q, the voltage and associated electric field strength of a given charge distribution increase as the plate area is reduced. This increased electric field strength helps to overcome any insulating barrier between a person's leg and the electrode, such as clothing or any small air gap that may form during the instant of separation of the person from the seat cushion. The increase in field strength is limited to that required to breakdown the insulating barrier; after dielectric breakdown commences, electric field strength collapses precipitously. As was mentioned previously, the discharge process nominally commences at a place and time wherein the person is still in contact with the seat cushion electrode, and continues as separation from the cushion is just beginning, and so proceeds with minimal spacing distances between the person and the seat cushion. This means that electrostatic voltages and energies will be relatively low. Again, sparks, if any, will occur in the vicinity of a vehicle seat, rather than near a fuel filler tube.

The separation of a person's back from a seat back can also cause an unbalanced charge on a person. Such a charge will be mostly neutralized by electrode 118, 310, 314, or 318 on outboard edge 224 of seat 114, because the person must turn sideways to put his or her feet outside the car, and perch on the edge of the seat before sliding or hopping out.

Although a conductive discharge path is the essence of these embodiments, the use of too high a conductance will discharge the body in an unnecessarily short interval, leading to unnecessarily higher peak discharge currents and powers, and an increased sensation of electrical shock. If the innate resistance of electrode 118 and electrical ground point 218 is not high enough to produce a total series resistance of more than 1.0 MΩ, it may be advantageous to increase the resistance of the circuit. The conductivity of the conductive surfaces may reduced somewhat, or they be connected to the chassis through a conventional optional resistor 216 (FIG. 2) or other connecting structure with a resistance of a value approximately up to those in the above range, to reduce the peak current and thereby reduce the feeling of electrical shock in an ESD event. The resistance will also enhance safety in the event that a powered 120 VAC or 240 VAC device is handled while in or near the vehicle by limiting the maximum AC fault current to some tens of μA.

The drawing of FIG. 2 shows a four-door sedan, as a typical example. If doors 120 are located only on one side, as for a passenger van, for example, each electrode 118 of the first embodiment should be placed on that (door) side of seat cushion 112.

A novel aspect of the embodiments is that electrode 118, 310, 314, or 318 is deployed at the critical area on the surface of seat 114—namely, that edge of the seat that is closest to the nearest vehicle door, or outboard edge 224 of seat 114—that will most effectively reduce the number and intensity of ESDs associated with egress from vehicles. This is because outboard edge 224, within the normally unoccupied area 222, is precisely that portion of seat 114 that is typically contacted last before egress by person 510; therefore, any and all charge person 510 collects during contact with seat 114 may be neutralized. Furthermore, electrodes 118, 310, 314, and 318 have two other characteristics that are employed in a novel manner to improve performance. First, electrodes 118, 310, 314, and 318 have a narrow overall shape, as defined by the overall aspect ratio range of about 2.0 to about 40.0. Secondly, electrodes 118, 310, 314, or 318 have sharp geometric features at their edges—the relatively small radius of curvature r1 of the edges, and, for electrodes 310, 314, or 318, the pointed shapes, including pointed serrations 312, raised points 316, and terminal ends 330, respectively. Because the narrow overall shape and sharp geometric features are both deployed at outboard edge 224 of seat 114, both further increase the electric field at precisely that portion of seat 114 that is typically contacted last before egress, thereby discharging person 510 more completely than prior art devices whose broader electrodes cover a larger portion of the seat surface, or than prior art devices which do not include sharp geometric features, or than prior art devices which do include sharp geometric features, but deploy them at locations other than near outboard edge 224. Finally, the novel lateral staggering of pointed shapes of electrodes 310, 314, and 318, as seen in FIGS. 4B, 5B, and 6B, provides electric field intensification over a wider lateral range of final points of contact of seat 114 with person 510, relative to the corresponding range for electrodes with unstaggered pointed shapes.

In summary, the placement and construction of the electrodes as disclosed herein allows much of the conductive material included in prior art designs to be omitted, while achieving results that are similar to, or better than, those of prior art. The embodiment thereby squarely addresses a long-felt but previously unsolved need, while producing significant material cost savings, and allowing greater freedom in seat design.

As can be appreciated by one skilled in the art, none of the disclosed embodiments have been previously suggested, and they address a long-felt but previously unsolved need in a crowded field of prior art.

Thus, the scope of the embodiments should be determined by the appended claims and their legal equivalents, rather than by the examples given.

What is claimed is:

1. A device for discharging static electricity from a person departing from a seated position within a vehicle, said vehicle having a seat cushion mounted thereto, said device comprising:
    an electrode attachable to a region on said seat cushion, said region consisting essentially of an area of said seat cushion extending between a seating area of said seat cushion and an outboard edge of said seat cushion,
    said electrode comprising a substantially flat strip of conductive material defining a generally rectangular shape having a length and a width, each edge of said electrode generally defining a blade shape, said electrode being configured for attaching to said seat cushion so that the width of said electrode extends between the seating area of said seat cushion and said outboard edge thereof, and
    an electrically conductive element connectable between said electrode and an electrical ground point in said vehicle,
    whereby said electrode reduces a breakdown voltage between said electrical ground point and said person near a final point of contact between said person and said seat cushion.

2. The device of claim 1, wherein said electrode further comprises a conductive material selected from the group consisting of conductive fabric, hot stamped conductive foil, hot stamped conductive polymer, hot stamped conductive ink, conductive paint, conductive ink, conductive wires woven into said seat cushion, and conductive threads woven into said seat cushion.

3. The device of claim 1, wherein said electrode is attachable to said seat cushion in one of a manufacturing step, an aftermarket application, and a replacement part installation.

4. A device for discharging static electricity from a person departing from a seated position within a vehicle, the vehicle having a seat cushion mounted thereto, said device comprising:
    an electrode attachable to a region on said seat cushion, said region consisting essentially of an area of said seat cushion extending between a seating area of said seat cushion and an outboard edge of said seat cushion,
    said electrode comprising a common conductor disposed along a length of the electrode and a plurality of tip conductors extending outwardly from said common conductor and substantially perpendicular thereto, each of said tip conductors having a first end coupled to said common conductor and a second terminal end, said electrode being arranged so that said terminal end of each of said tip conductors faces said outboard edge of said seat cushion when said electrode is attached to said seat cushion, said electrode defining a substantially flat shape, a spacing of said tip conductors being in a range between about 0.2 inches to about 2.0 inches, and
    an electrically conductive element connectable between said electrode and an electrical ground point in said vehicle,
    whereby said electrode reduces a breakdown voltage between said electrical ground point and said person near a final point of contact between said person and said seat cushion.

5. The device of claim 4, wherein each tip conductor of said plurality of tip conductors defines a length different than a length of the tip conductor adjacent thereto.

6. A device for discharging static electricity from a person departing from a seated position within a vehicle, the vehicle having a seat cushion mounted thereto, said device comprising:
    an electrode attachable to a region on said seat cushion, said region consisting essentially of an area of said seat cushion extending between a seating area of said seat cushion and an outboard edge of said seat cushion,
    said electrode comprising a common conductor disposed along a length of the electrode and a plurality of tip conductors extending outwardly from said common conductor and substantially perpendicular thereto, each of said tip conductors having a first end coupled to said common conductor and a second terminal end, said electrode being arranged so that said terminal end of each of said tip conductors faces said outboard edge of said seat cushion when said electrode is attached to said seat cushion, said electrode defining a substantially flat shape, a spacing of said tip conductors being in a range between about 0.2 inches to about 2.0 inches, wherein each of said common conductor and said tip conductors further comprise a conductive material selected from the group consisting of hot stamped conductive foil, hot stamped conductive polymer, hot stamped conductive ink, conductive fabric, conductive paint, conductive ink, conductive wires woven into said seat cushion, and conductive threads woven into said seat cushion, and an electrically conductive element connectable between said electrode and an electrical ground point in said vehicle, whereby said electrode reduces a breakdown voltage between said electrical ground point and said person near a final point of contact between said person and said seat cushion.

7. The device of claim 4, wherein said electrode is attachable to said seat cushion in one of a manufacturing step, an aftermarket application, and a replacement part installation.

\* \* \* \* \*